United States Patent [19]

Sakai et al.

[11] Patent Number: 5,532,762
[45] Date of Patent: Jul. 2, 1996

[54] DIGITAL BROADCAST RECEIVER THAT SWITCHES BETWEEN NICAM AUDIO AND ANALOG AUDIO

[75] Inventors: Yuji Sakai; Yasuhisa Nakajima, both of Kanagawa, Japan

[73] Assignee: Sony Corporation, Tokyo, Japan

[21] Appl. No.: 389,659

[22] Filed: Feb. 16, 1995

[30] Foreign Application Priority Data

Feb. 28, 1994 [JP] Japan .................................. 6-055166

[51] Int. Cl.[6] .................................... H04N 5/60
[52] U.S. Cl. .......................... 348/738; 348/731; 455/6.3; 381/3
[58] Field of Search ..................... 348/731, 738, 348/732; 455/6.3, 205, 214, 147; 381/2, 3, 13, 77; H04N 5/60

[56] References Cited

U.S. PATENT DOCUMENTS

| | | | |
|---|---|---|---|
| 5,038,402 | 8/1991 | Robbins | 455/6.3 |
| 5,072,297 | 12/1991 | Kanazawa et al. | |
| 5,202,766 | 4/1993 | Mehrgardt et al. | 358/198 |
| 5,220,602 | 6/1993 | Robbins et al. | 380/20 |
| 5,450,081 | 9/1995 | Kuhn et al. | 341/94 |

FOREIGN PATENT DOCUMENTS

| | | |
|---|---|---|
| 0278171 | 8/1988 | European Pat. Off. |
| 0374433 | 6/1990 | European Pat. Off. |
| 437965 | 7/1991 | European Pat. Off. ......... H04N 5/60 |
| 0514041 | 11/1992 | European Pat. Off. |

OTHER PUBLICATIONS

Patent Abstracts of Japan, vol. 14, No. 433, Jun. 27, 1990 (S. Kazuhiko et al.).
BBC Research Department Report, "NICAM 728—Digital Two-Channel Sound for Terrestrial Television," No. 6, 1990, pp. 1-27 (A. J. Bower).
Elektor Electronics, "The NICAM System," No. 200, May 1992, pp. 29-33 (J. Buiting).
IEEE Trans. on Consumer Electronics, "NICAM Decoder for Digital Multi-Channel TV Sound Broadcast," vol. 37, No. 3, Aug. 1991, pp. 684-691, (G. Shipton et al.).
Electronic Components & Applications, "NICAM—728 Two-Channel Digital TV Sound," vol. 10, No. 3, 1990, pp. 121-127 (P. Double).

*Primary Examiner*—Victor R. Kostak
*Assistant Examiner*—Glenton B. Burgess
*Attorney, Agent, or Firm*—Jay H. Maioli

[57] ABSTRACT

A digital audio broadcast receiving apparatus that minimizes a frequency at which the user switches between NICAM audio and analog audio. When a reserve audio switching flag C4 is "H" it indicates that analog audio and NICAM audio represent the same program, in which NICAM audio, which provides better sound quality, is automatically selected. If a broadcast receiving condition deteriorates, analog audio is automatically selected. Conversely, when the flag C4 is "L", it indicates that NICAM audio and analog audio represent two different programs. In this case, analog audio that is in synchronization with video is automatically selected. At this moment, it is possible that the user intentionally selects NICAM audio, which is not related to video, so that NICAM audio is not switched to analog audio even if NICAM audio has some noise. An audio switching point is shifted by changing a threshold for determining PCM data error rate or by changing a sampling time.

5 Claims, 6 Drawing Sheets

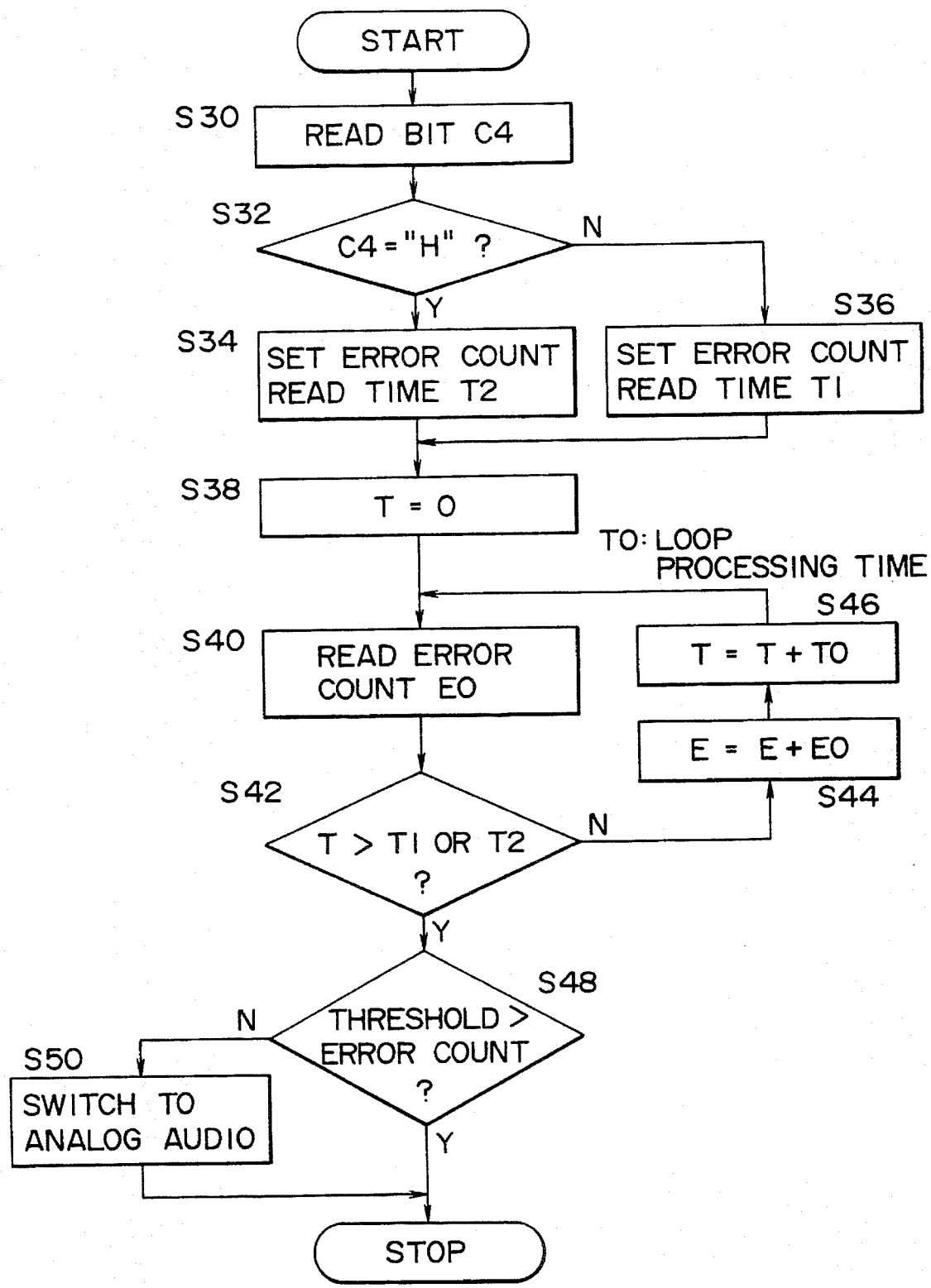

THRESHOLD CHANGING METHOD

SAMPLING TIME CHANGING METHOD

1

DIGITAL BROADCAST RECEIVER THAT SWITCHES BETWEEN NICAM AUDIO AND ANALOG AUDIO

BACKGROUND OF THE INVENTION

1. Field of the Invention

The present invention relates to NICAM (Near Instantaneous Compound Audio Multiplex) broadcasting and, more particularly, to a digital audio broadcasting receiving apparatus having a capability of automatically switching between a NICAM audio signal and an analog audio signal by means of the information represented by a control bit contained in a NICAM signal.

2. Description of Related Art

NICAM broadcasting, one of several television audio multiplexing schemes, is for multiplexing digital audio signals to be transmitted. Especially, Europe has started to provide the service of NICAM broadcasting in addition to the conventional teletext. It is therefore required in Europe that the CATV (Cable Television) has the multichannel receiving capability and, at the same time, can decode the digital audio signal of NICAM broadcasting with good reproducibility. The European NICAM broadcasting carries data at a transfer rate of 728 kbits/second. The data includes a frame, two audio channels (704 kbits), and indication data (11 kbits). NICAM broadcasting therefore can transmit up to three channels of different audio information including analog audio (one channel).

Thus, NICAM broadcasting provides service with analog audio and digital audio combined. A digital broadcast receiving apparatus that receives NICAM broadcasting needs to determine which audio signal is being received to decode the received audio signal with good reproducibility. To allow the receiving apparatus to make the determination, the NICAM signal contains control bits for indicating in which state a particular transmission is being made. The control bits include C0, C1, C2, C3, and C4. The control bit C4, a reserve audio switching flag, is assigned as an indication bit for indicating a relationship between contents of analog audio and NICAM audio. Consequently, with the conventional digital audio broadcast receiving apparatus, it is determined whether to automatically switch between NICAM audio and analog audio based on the information represented by the reserve audio switching flag C4. U.S. Pat. No. 5,138,457 is art related to the present application.

Turning to the above-mentioned digital audio broadcast receiving apparatus, the automatic switching is made also in considering a case in which NICAM audio and analog audio represent two different programs, thereby making the switching too late if the NICAM audio and analog audio represent the same program. Since NICAM audio is based on PCM (Pulse Code Modulation), switching that is too late increases an error rate, thereby impairing listenability. To solve this problem, assume that the switching be set to an earlier point. Such a setting, however, causes analog audio to be automatically selected when a user wants NICAM audio even if its sound quality is less desirable when NICAM audio and analog audio represent separate programs. Each time the automatic selection occurs, the user must make audio switching manually. In addition, some receiving apparatuses permit no manual switching.

SUMMARY OF THE INVENTION

It is therefore an object of the present invention to provide a digital audio broadcast receiving apparatus for reducing to a necessary minimum the frequency at which the user makes switching between NICAM audio and analog audio.

In carrying out the invention and according to a first aspect thereof, there is provided a digital audio broadcast receiving apparatus having a controller for changing switching points between NICAM audio and analog audio according to a control bit representing audio contents when a NICAM audio broadcast is received.

In carrying out the invention and according to a second aspect thereof, there is provided a digital audio broadcast receiving apparatus wherein the above-mentioned controller has an error rate changing device for changing error rate values that provide a reference for determining a switching point between NICAM audio and analog audio according to the content of the above-mentioned control bit.

In carrying out the invention and according to a third aspect thereof, there is provided a digital audio broadcast receiving apparatus wherein the above-mentioned controller has a counting duration changing device for changing a duration of counting errors that provide a reference for determining a switching point between NICAM audio and analog audio according to the content of the above-mentioned control bit.

In carrying out the invention and according to a fourth aspect thereof, there is provided a digital audio broadcast receiving apparatus wherein the above-mentioned controller shuts off audio output when switching between NICAM audio and analog audio.

The above and other objects, features and advantages of the present invention will become more apparent from the accompanying drawings, in which like reference numerals are used to identify the same or similar parts in several views.

BRIEF DESCRIPTION OF THE DRAWINGS

FIG. 4 is a flowchart for changing a sampling time used in the embodiment of FIG. 1.

DETAILED DESCRIPTION OF THE PREFERRED EMBODIMENTS

This invention will be described in further detail by way of example with reference to the accompanying drawings.

Figure 1:
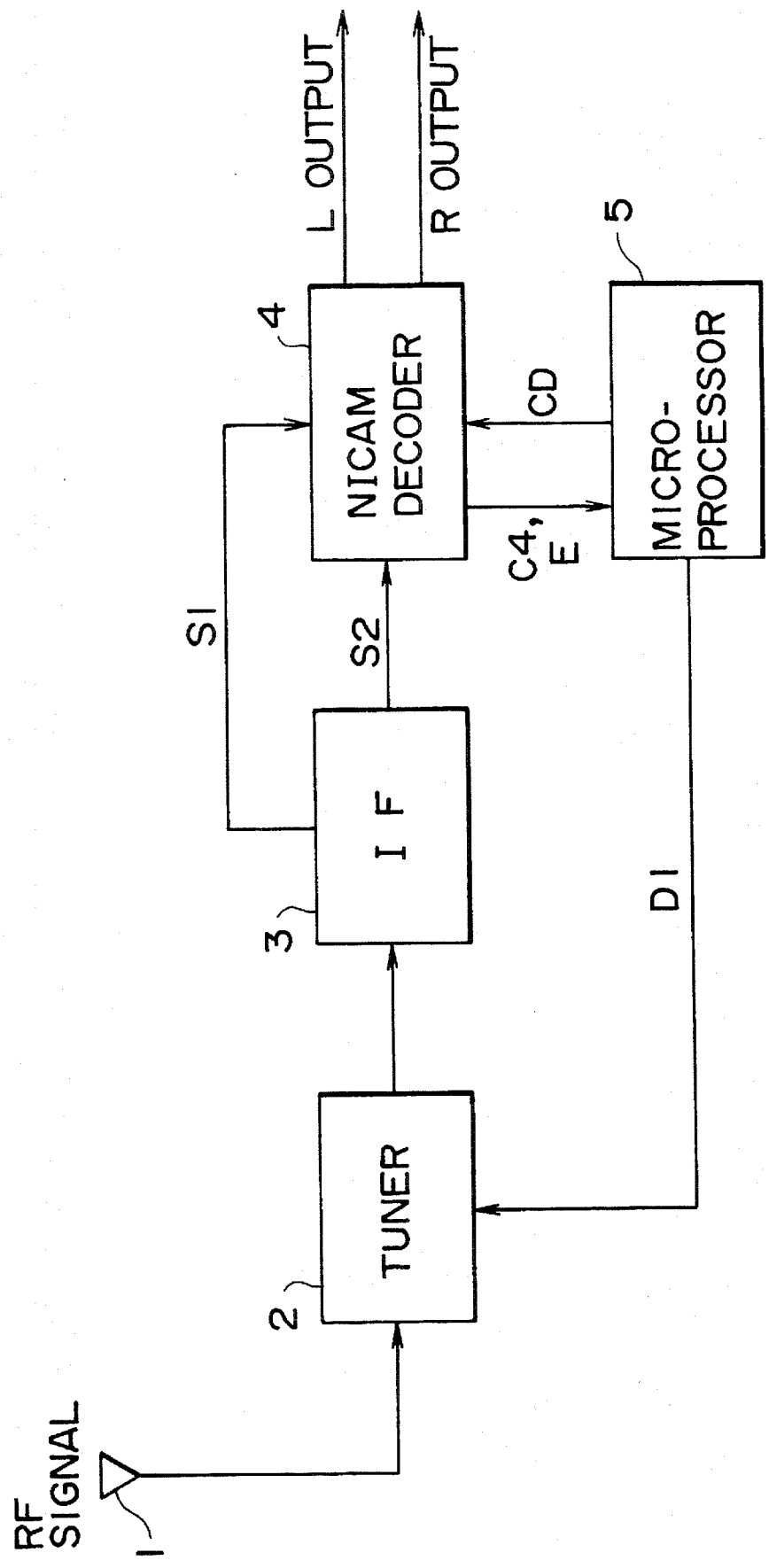
FIG. 1 is a block diagram illustrating the digital audio broadcast receiving apparatus practiced as one preferred embodiment of the invention.

Now, referring to FIG. 1, there is shown a constitution of the digital audio broadcast receiving apparatus practiced as one preferred embodiment of the present invention. In the figure, reference numeral 1 indicates an antenna for receiving an RF signal transmitted from a broadcasting station in a NICAM broadcasting manner. The antenna 1 sends the received RF signal to a tuner 2. Based on a tuning data D1 received from a microprocessor 5, the tuner 2 selects from the received RF signal a signal of a predetermined channel and sends the selected signal to an intermediate frequency amplifier (IF) 3. The intermediate frequency amplifier 3 extracts a conventional FM audio signal S1 from the RF signal and, at the same time, extracts a QPSK (Quadrature Phase Shift Keying) carrier S2 of a digital audio signal to supply the S1 and S2 to a NICAM decoder 4. The NICAM decoder 4 is composed of an integrated circuit for extracting, based on a user-written command, audio information from the NICAM signal. In the present embodiment, a Phillips SAA7282 chip is used as the integrated circuit. In the present embodiment, the above-mentioned command is written by means of the microprocessor 5. Based on the written command, the NICAM decoder 4 decodes a digital audio signal superimposed on the QPSK carrier S2, converts the decoded digital audio signal to an analog signal by means of a D/A converter incorporated therein, and outputs the L (Left) and the R (Right) outputs of the analog signal to the outside. At the same time, the NICAM decoder 4 supplies a reserve audio switching flag C4, one of the control bits contained in the decoded NICAM signal, and error information E to the microprocessor 5. Based on the reserve audio switching flag C4 and the error information E, the microprocessor 5 outputs the above-mentioned predetermined command CD to control the NICAM decoder 4.

Figure 2A:
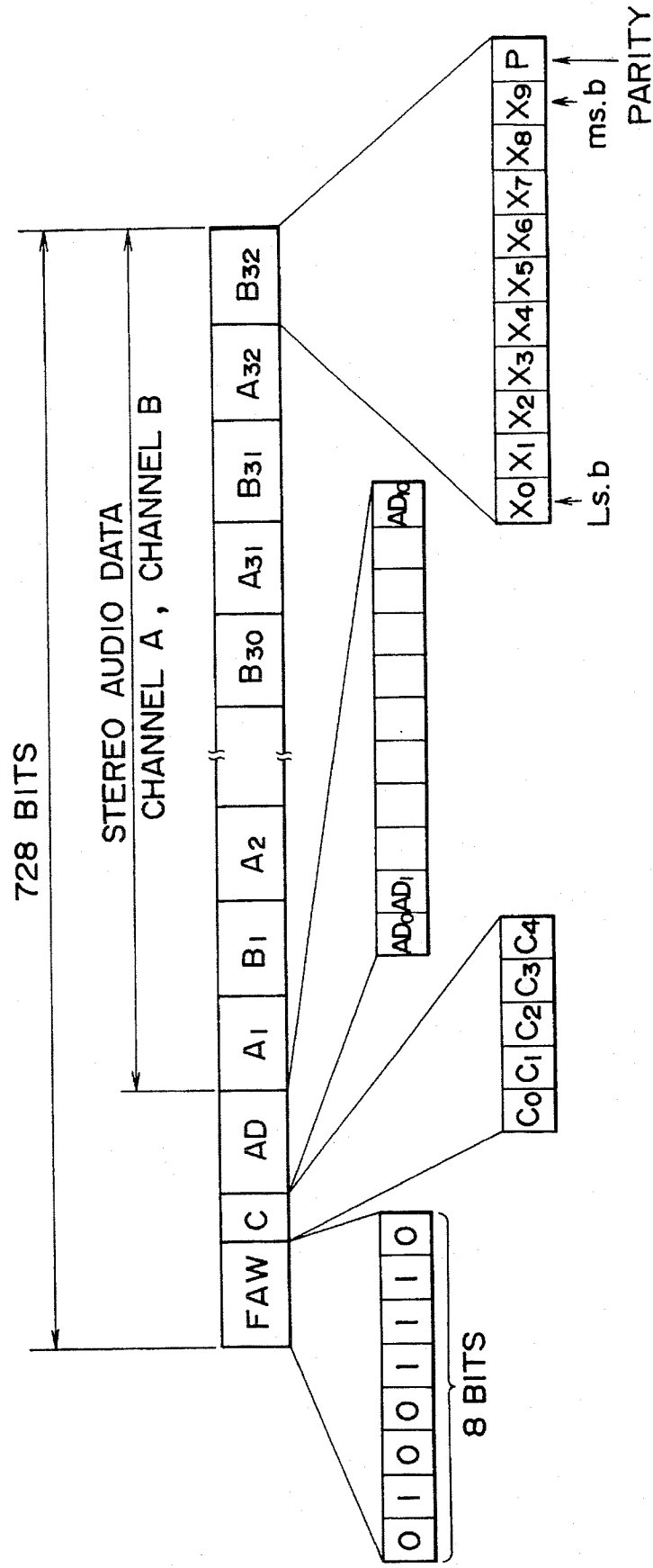
FIGS. 2A and 2B are schematic diagrams illustrating data configurations of NICAM signals.
Figure 2B:
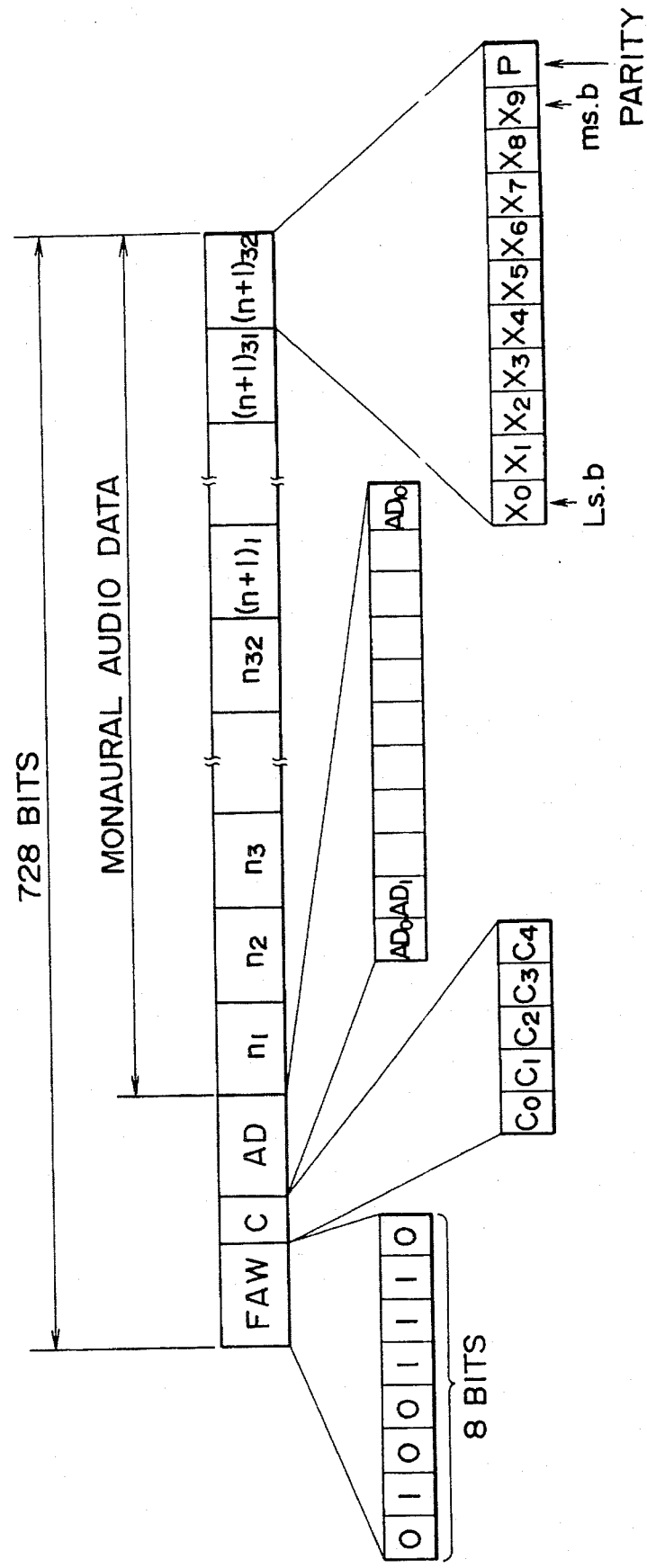

In what follows, the data configuration of the NICAM signal (consisting of a 728-bit frame) will be described with reference to FIGS. 2A and 2B. FIG. 2 is a schematic diagram illustrating the data configuration of the NICAM signal (consisting of a 728-bit frame). FIG. 2A schematically shows a data configuration for stereo audio, while FIG. 2B schematically shows a data configuration for monaural audio. Now, referring to FIG. 2A, one frame of stereo audio starts with an FAW (Frame Alignment Word) consisting of eight bits, followed by control bits C consisting of one frame flag bit C0, three application control bits C1 through C3, and one reserve audio switching flag C4, additional data AD to be transmitted along with the audio signal, and audio data A1, B1, . . . A32, B32 of channels A and B, in this order, amounting to a total of 728 bits. Likewise, one frame of monaural audio shown in FIG. 2B starts with an FAW consisting of eight bits, followed by control bits C consisting of one frame flag bit C0, three application control bits C1 through C3, and one reserve audio switching flag C4, additional data AD to be transmitted along with the audio signal, and monaural audio data n1, n2, . . . (n+1)31, (n+1)32, in this order, amounting to a total of 728 bits.

In the above-mentioned NICAM signal, a maximum of two channels of audio information can be transmitted. The audio information is transmitted in one of the following three combinations:

(1) Stereo audio signal;

(2) two independent monaural audio signals (so-called dual mono); and (3) monaural audio signal plus data.

The combinatorial information is assigned to the control bits C shown in FIGS. 2A and 2B. The information about the relationship with analog FM audio is also assigned to the reserve audio switching flag C4. If analog audio (FM) and NICAM audio represent the same program, the reserve audio switching flag C4 is set to "H" (High); if analog audio (FM) and NICAM audio represent two different programs, the flag C4 is set to "L" (Low). In the digital audio broadcast apparatus practiced as the present embodiment of the invention, switching points between analog audio and NICAM audio are changed based on the information of the flag C4.

Namely, if the flag C4 is "H" it indicates that analog audio and NICAM audio are transmitting the same program. In this case, NICAM audio, which is better in sound quality is automatically selected. Conversely, if the flag C4 is "L" it indicates that analog audio and NICAM audio are transmitting two different programs. In this case, analog audio, which is in synchronization with video, is automatically selected.

Further, when the reserve audio switching flag C4 is "H" if the receiving condition worsens, NICAM audio, which is based on digital PCM, increases in noise as compared with analog audio, thereby lowering listenability. Therefore, when the error rate of NICAM audio, or PCM data, exceeds a predetermined threshold, NICAM audio is automatically selected over analog audio. On the contrary, if the flag C4 is "L" and the user selects the audio not related to the currently displayed video, namely, the user selects NICAM audio, it may be taken that the user does not desire the switching from NICAM audio to analog audio to take place even if the currently selected NICAM audio may be poor in listenability because the user selects NICAM audio intentionally. Hence, the error rate of PCM data is given a greater allowance and a larger threshold than the above-mentioned threshold is set, thereby enabling the switching to analog audio when the larger threshold is exceeded.

Thus, in the present embodiment, the threshold for determining the error rate of PCM data is changed or a sampling time is changed to switch between the audio schemes based on the reserve audio switching flag C4.

Figure 3:
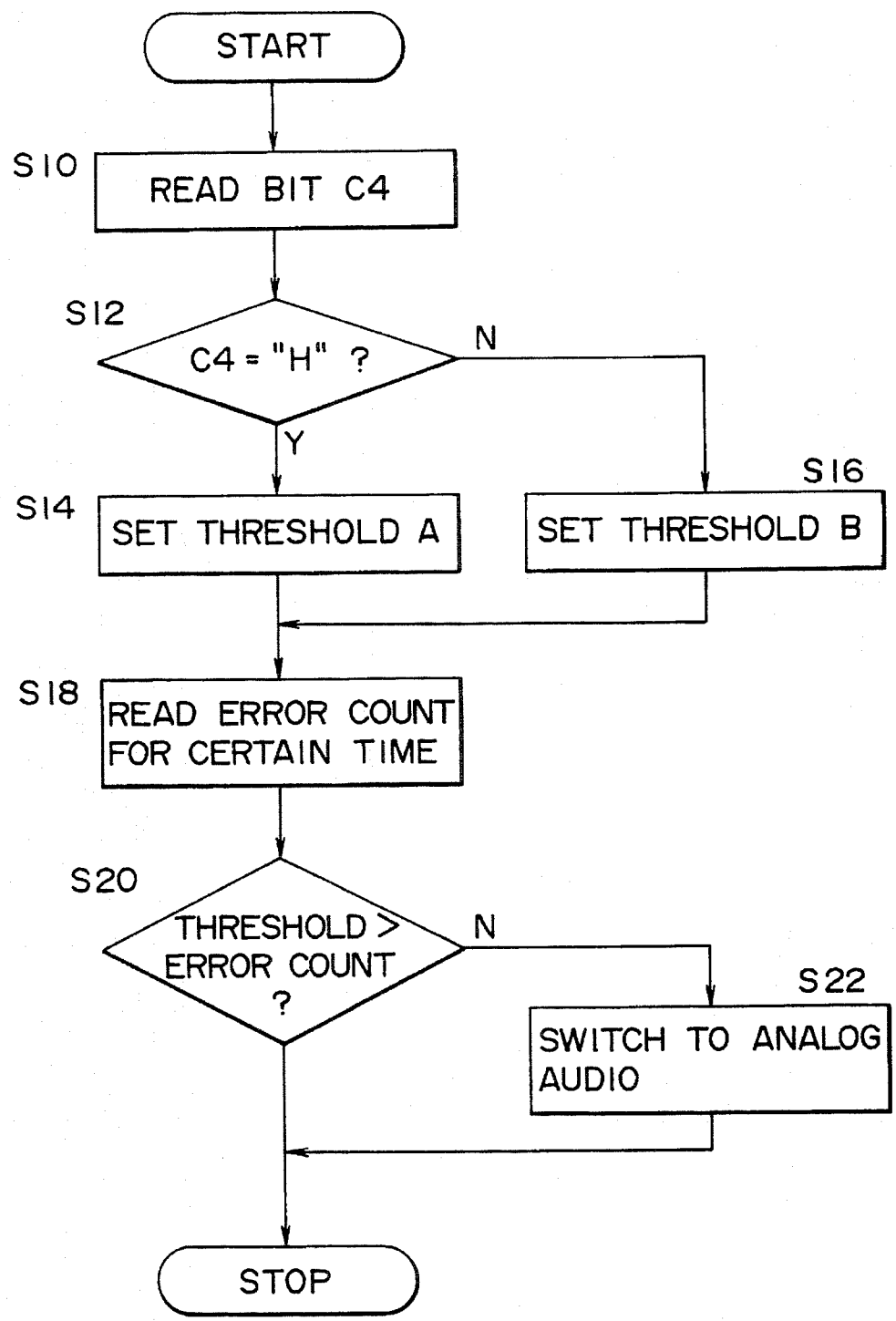
FIG. 3 is a flowchart for changing threshold values used in the embodiment of FIG. 1.
Figure 5A:
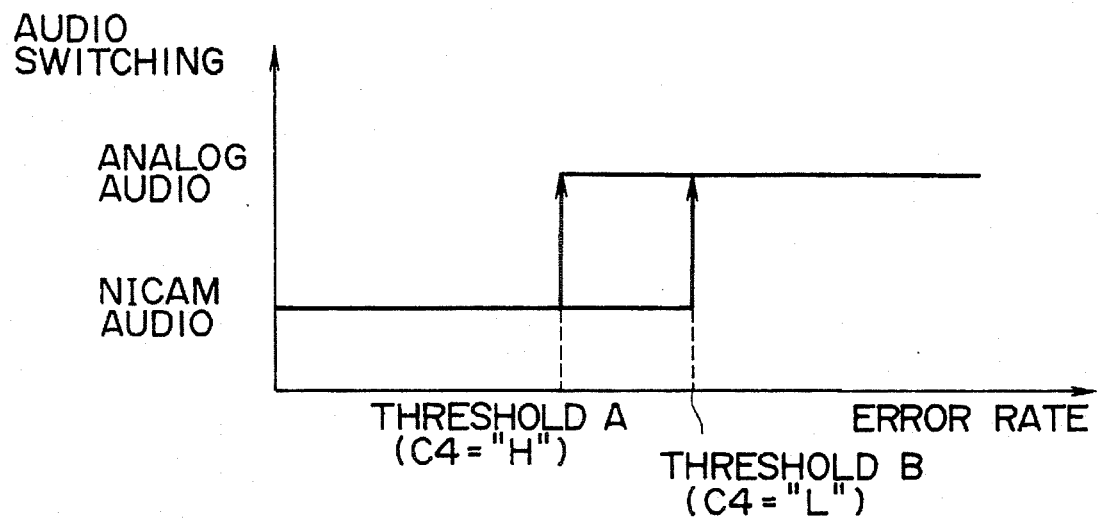
FIGS. 5A and 5B are graphs for describing threshold value changing timings used in the embodiment of FIG. 1.
Figure 5B:
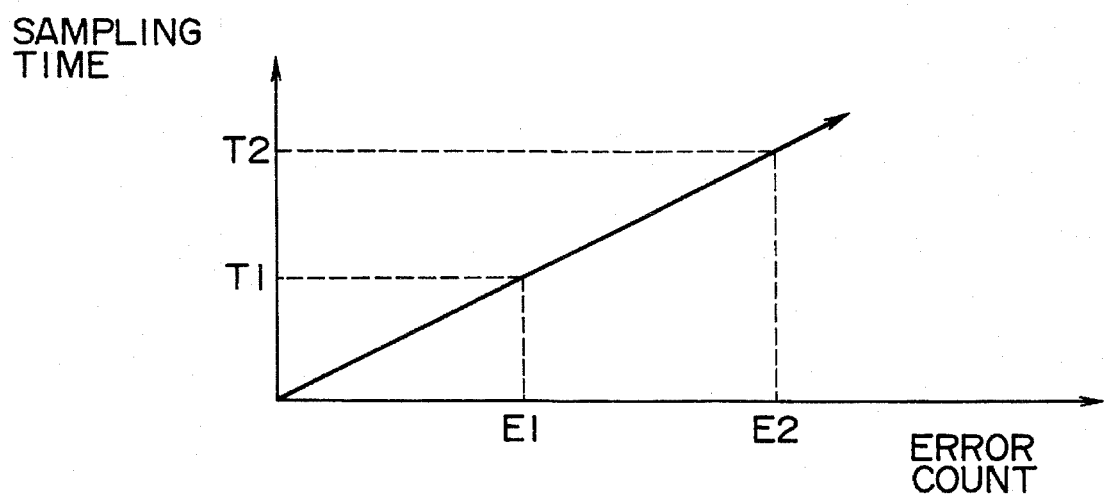

Operations of the present embodiment of the above-mentioned constitution will be described below with reference to FIGS. 3 through 5. FIG. 3 is a flowchart of the operation for changing threshold values used in the present embodiment. FIG. 4 is a flowchart of the operation for changing sampling time used in the present embodiment. FIG. 5A illustrates a threshold changing timing and FIG. 5B illustrates a sampling time changing timing.

An RF signal based on NICAM broadcasting transmitted from a broadcasting station is received by the antenna 1 to be sent to the tuner 2. In the tuner 2, a signal of a predetermined channel is extracted from the RF signal according to the tuning data D1 supplied from the microprocessor 5. The extracted signal is supplied to the intermediate frequency amplifier 3. In the intermediate frequency amplifier 3, the original FM audio signal S1 is extracted from the signal selected by the tuner 2 and the QPSK carrier S2 of the digital audio signal is also extracted from the same signal. Both the extracted signals are sent to the NICAM decoder 4. Based on the command CD sent from the microprocessor 5, the NICAM decoder 4 either decodes the digital audio signal superimposed on the QPSK carrier S2 or outputs the analog audio signal. At this moment, the NICAM decoder 4 supplies the reserve audio switching flag C4 of the control bits C contained in the NICAM signal as well as the error information E to the microprocessor 5. Based on the flag C4 and the error information E, the microprocessor 5 performs the following processing.

First, the threshold changing operation will be described. In step S10, the microprocessor 5 reads the content of the reserve audio switching flag C4. Then, in step S12, the microprocessor 5 determines whether the flag C4 is "H". If the flag C4 is found "H" the decision result of step S12 is "YES" and the processing proceeds to step S14. In step S14, the microprocessor 5 sets the threshold to value A. On the other hand, if the flag C4 is found to be "L", the decision result in step 12 is "NO" and the processing goes to step S16. In step S16, the microprocessor 5 sets the threshold to B. It should be noted that threshold B is greater than threshold A.

When the threshold has been set in step S14 or S16, the processing proceeds to step S18. In step S18, the microprocessor 5 counts an error count for a certain duration of time. Then, in step S20, the microprocessor 5 determines the error value counted in step S18 is smaller than the threshold A or B set in step S14 or S16 respectively. If the error count is found smaller than the threshold, the decision result in step S20 is "YES" and NICAM audio is kept selected, upon which the above-mentioned processing terminates. If the error count is found greater than the threshold, the decision result in step S20 is "NO" and NICAM audio is switched to analog audio, upon which the processing terminates.

Thus, when the reserve audio switching flag C4 is "H" analog audio is selected at the threshold A that does not degrade NICAM audio much as shown in FIG. 5A. When the flag C4 is "L" NICAM audio is kept selected until the threshold B of the error rate that does not degrade NICAM audio remarkably is reached as shown in FIG. 5A. Consequently, if the flag C4 is "L" and the user selects the audio not related to the currently displayed video, namely, the user selects NICAM audio, it may be taken that the user does not desire the switching from NICAM audio to analog audio to take place even if the currently selected NICAM audio may be poor in listenability because the user selects NICAM audio intentionally. When NICAM audio gets noisy increasingly noisy and the threshold B at which NICAM audio is hardly listenable is exceeded, NICAM audio is switched to analog audio.

Now, operations of changing sampling time will be described with reference to FIG. 4. First, in step S30, the microprocessor 5 reads the content of reserve audio switching flag C4. Then, in step S32, the microprocessor 5 determines whether the flag C4 is "H". If the flag C4 is found to be "H" the decision result in step S32 is "YES" and the processing proceeds to step S34. In step S34, the microprocessor 5 sets an error count read period (or sampling time) to T2. If the flag C4 is found to be "L", the decision result in step S36 is "NO" and the processing proceeds to step 36. In step S36, the microprocessor 5 sets the sampling time to T1. It should be noted that T2 is greater than T1.

Next, when the sampling time has been set in step S34 or S36, the processing proceeds to step S38. In step S38, the microprocessor 5 sets the sampling time T to "0". The microprocessor 5 uses this sampling time as a counter for counting a duration of time in which to count the number of errors. Then, in step S40, the microprocessor 5 reads error count E0 and in step S42, determines whether the sampling time T has exceeded T1 or T2. If the sampling time T is found smaller than T1 or T2, or the number of errors for the sampling time has not been counted, the decision result in step 42 is "NO" and the processing proceeds to step 44. In step S44, the microprocessor 5 adds the error count E0 read in step S40 to the error count E. Then, in step S46, the microprocessor 5 adds loop processing time T0 to the sampling time T, upon which the processing goes back to step S40. Subsequently, the microprocessor 5 repeats steps S40 through S46 until the sampling time T gets larger than T1 or T2. As a result, the error count E contains a total number of errors encountered during T1 or T2.

When the sampling time gets larger than T1 or T2, the decision result in step S42 is "YES" and the processing proceeds to step S48. In step S48, the microprocessor 5 determines whether the above-mentioned error count E is smaller than the preset threshold. If the error count E is found smaller the preset threshold, the decision result in step S48 is "YES" and the microprocessor 5 keeps NICAM audio as the audio to be output, upon which the above-mentioned processing terminates. If the error count E is found greater than the preset threshold, the decision result in step S48 is "NO" and the processing proceeds to step 50. In step S50, the microcomputer 5 makes switching from NICAM audio to analog audio, upon which the processing terminates.

Thus, changing the error count sampling time according to the "H" state of the reserve audio switching flag C4 provides the same control operation as that provided by changing the threshold values as described earlier. Namely, when the flag C4 is "H" , the sampling time is set to T1 (<T2) as shown in FIG. 5B and, when the count of errors encountered during the sampling time T1 exceeds the predetermined threshold, switching is made from NICAM audio to analog audio. On the other hand, when the flag C4 is "L", the sampling time is set to T2 (>T1) as shown in FIG. 5B and, until the count of errors encountered during the sampling time T2 exceeds the predetermined threshold, NICAM audio is kept selected. Therefore, when the flag C4 is "L" and the user selects the audio other than video contents, namely the user selects NICAM audio, it may be taken that the user does not desire the switching from NICAM audio to analog audio to take place even if the currently selected NICAM audio may be poor in listenability because the user selects NICAM audio intentionally. When NICAM audio gets increasingly noisy to become hardly listenable, NICAM audio is switched to analog audio.

Thus, according to the present embodiment of the invention, optimum audio output can always be selected in accordance with the variation in broadcast receiving condition. It will be apparent to those skilled in the art that both the threshold and the sampling time may be changed to achieve the same effect as mentioned above. In this case, however, a finer, subtler setting may be made. It will also be apparent that NICAM audio many be muted instead of changing the switching timing between NICAM audio and analog audio according to the state of the reserve audio switching flag C4 as in the above-mentioned embodiment of the invention.

As described and according to the first aspect of the invention, the digital audio broadcast receiving apparatus has the controller for changing the point of switching between NICAM audio and analog audio according to the content of the control bit that indicates audio contents at receiving NICAM audio. In the novel setup, if NICAM audio and analog audio represent the same program, switching is automatically made from NICAM audio to analog audio having better sensitivity upon degradation of NICAM audio sound quality due to a weak electromagnetic field or the like; if NICAM audio and analog audio represent two different programs, the automatic switching is not made in so far as NICAM audio degraded in sound quality remains listenable. Thus, this novel setup provides an advantage that the frequency at which the user performs manual switching between NICAM audio and analog audio is minimized for user convenience.

As described and according to the second aspect of the invention, the controller of the digital audio broadcast receiving apparatus has the error rate changing device for changing the error rate that provides reference for determining the switching point between NICAM audio and analog audio according to the content of the control bit. Thus, this novel setup provides an advantage that the frequency at which the user performs manual switching between NICAM audio and analog audio is minimized for user convenience.

As described and according to the third aspect of the invention, the controller of the digital audio broadcast receiving apparatus has the count time changing device for changing the duration of counting the number of errors that provides reference for determining the switching point between NICAM audio and analog audio according to the content of the control bit. Thus, this novel setup provides an advantage that the frequency at which the user performs manual switching between NICAM audio and analog audio is minimized for user convenience.

As described and according to the fourth aspect of the invention, the controller of the digital audio broadcast receiving apparatus shuts off audio output when switching between NICAM audio and analog audio according to the content of the control bit. Thus, this novel setup provides an advantage that the frequency at which the user performs manual switching between NICAM audio and analog audio is minimized for user convenience.

While the preferred embodiments of the present invention have been described using specific terms, such description is for illustrative purposes only, and it is to be understood that changes and variations may be made without departing from the spirit or scope of the appended claims.

What is claimed is:

1. A television receiving apparatus comprising:

a tuner for receiving a broadcast signal;

an intermediate frequency amplifier for extracting a frequency-modulated audio signal and a digital audio signal from an output signal of said tuner;

a decoder for receiving said frequency-modulated audio signal and said digital audio signal from said intermediate frequency amplifier and producing an output therefrom and for detecting a control bit in said digital audio signal; and control means connected to said decoder for changing a point in the broadcast signal at which said decoder selects one of said frequency-modulated audio signal and said digital audio signal as said output according to the contents of said control bit, wherein said control means includes error rate changing means for changing an error rate that provides a reference for determining the point at which said frequency-modulated audio signal and said digital audio signal are selected according to the contents of said control bit.

2. The television receiving apparatus as defined in claim 1, wherein said control means includes count time changing means for changing a time for counting the number of errors that provides a reference for determining the point at which said frequency-modulated audio signal and said digital audio signal are selected according to the contents of said control bit.

3. The television receiving apparatus as defined in claim 2, wherein said control means temporarily shuts off said output from said decoder when selecting one of said frequency-modulated audio signal and said digital audio signal according to the contents of said control bit.

4. A television receiving apparatus comprising:

a tuner for receiving a broadcast signal;

an intermediate frequency amplifier for extracting a frequency-modulated audio signal and a digital audio signal from an output signal of said tuner;

a decoder for receiving said frequency-modulated audio signal and said digital audio signal from said intermediate frequency amplifier and producing an output therefrom and for detecting a control bit in said digital audio signal; and control means connected to said decoder for changing a point in the broadcast signal at which said decoder selects one of said frequency-modulated audio signal and said digital audio signal as said output according to the contents of said control bit, wherein said control means includes count time changing means for a changing a time for counting the number of errors that provides a reference for determining the point at which said frequency-modulated audio signal and said digital audio signal are selected according to the contents of said control bit.

5. A television receiving apparatus comprising:

a tuner for receiving a broadcast signal;

an intermediate frequency amplifier for extracting a frequency-modulated audio signal and a digital audio signal from an output signal of said tuner;

a decoder for receiving said frequency-modulated audio signal and said digital audio signal from said intermediate frequency amplifier and producing an output therefrom and for detecting a control bit in said digital audio signal; and control means connected to said decoder for changing a point in the broadcast signal at which said decoder selects one of said frequency-modulated audio signal and said digital audio signal as said output according to the contents of said control bit, wherein said control means temporarily shuts off said output from said decoder when selecting one of said frequency-modulated audio signal and said digital audio signal according to the contents of said control bit.

* * * * *